L. DRAKE.
HONEY-PACKAGE.

No. 170,622. Patented Nov. 30, 1875.

WITNESSES:
C. Nevens
Alex F. Roberts

INVENTOR:
L. Drake
BY
Munn
ATTORNEYS.

UNITED STATES PATENT OFFICE.

LAWRENCE DRAKE, OF NEW YORK, N. Y.

IMPROVEMENT IN HONEY-PACKAGES.

Specification forming part of Letters Patent No. 170,622, dated November 30, 1875; application filed October 23, 1875.

*To all whom it may concern:*

Be it known that I, LAWRENCE DRAKE, of the city, county, and State of New York, have invented a new and Improved Honey-Package, of which the following is a specification:

My improved package for honey is a glass jar contrived in form and shape for receiving and inclosing a comb of honey and the frame in which the honey is made, the cover being of glass, sheet metal, paper, or any other approved material.

The object is to provide a package that will protect the honey from flies, air, and dirt, and at the same time expose it to the inspection of the purchaser.

At the present time these combs are kept in the frames while on sale, and are exposed, when taken out of the boxes in which they are kept, to the atmosphere and dirt and flies, and when sold to the consumer have to be packed in paper, which sticks to and injures the honey, and makes but a poor and insecure package for an article of this character.

Figure 1:
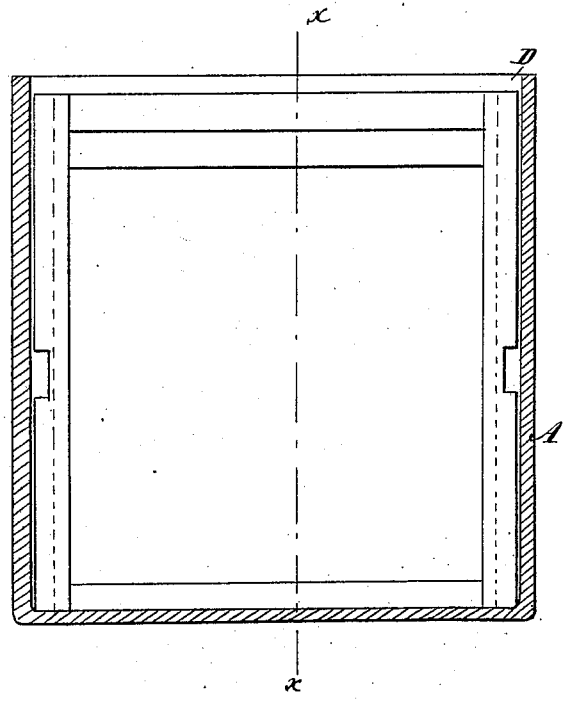
Figure 2:
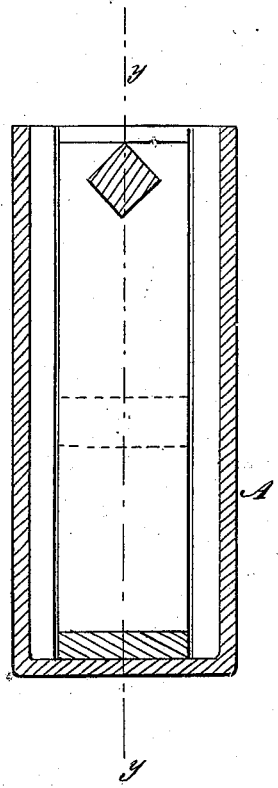
Figure 3:
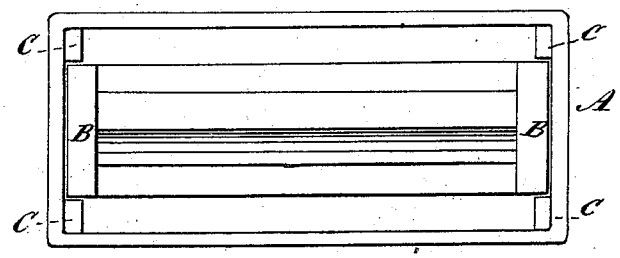

Figure 1 is a sectional elevation of my improved honey-package, taken on the line $x$ $x$ of Fig. 2. Fig. 2 is a transverse section, taken on the line $y$ $y$ of Fig. 1; and Fig. 3 is a top view.

Similar letters of reference indicate corresponding parts.

A represents a box-shaped jar, of glass, of suitable form and size to receive a comb of honey in a frame, B, the top of the jar being open for the purpose. At each end are guides C for holding the frame so that the honey will be protected from contact with the sides of the jar, and at D are shoulders, whereon to rest a glass, pasteboard, or other cover, for closing the jar. A thin stamped-metal cover, shutting down over the top, or a paper or pasteboard cover of similar form, may be used.

The honey will be packed in these glass jars by the manufacturer before sending it to market, or by retailer after receiving it in original packages of other form adapted only for sending to market in larger quantities than are acceptable to the consumer. In this way the consumer can procure clean honey in a piece state, which is not now to be had, owing to the imperfect means of packing it, although it is sometimes put up in ordinary round glass jars, together with gelatine, sirups, and the like, the combs being removed from the frames B, and broken into sections small enough to be put into such jars.

The guides C at the corners, for keeping the combs in place, may be square offsets, as shown in the drawing; or they may be rounded, or partly square and partly rounded, as it may suit the fancy of the maker, and they may be made by bulging out the middle portion of the ends of the box or can in any approved form.

One advantage of my invention is, that the honey may readily be prevented from running or liquefying in warm weather by immersing the glass in cold water, while the jar may be again used, after the honey has been used in the family, for the same purpose, or for butter, preserves, or many analogous articles; hence,

What I claim is—

A honey-package, in which the honey, as originally deposited in its frame, is incased, with its frame, in a glass receptacle of appropriate dimensions and strength, substantially as and for the purpose specified.

LAWRENCE DRAKE.

Witnesses:
  JAMES H. HUNTER,
  ALEX. F. ROBERTS.